United States Patent
Ibrahim et al.

(10) Patent No.: US 9,408,033 B2
(45) Date of Patent: *Aug. 2, 2016

(54) HYBRID LOCATION DETERMINATION FOR WIRELESS COMMUNICATION DEVICE

(71) Applicant: BROADCOM CORPORATION, Irvine, CA (US)

(72) Inventors: Brima B. Ibrahim, Laguna Hills, CA (US); Prasanna Desai, Elfin Forest, CA (US); Donald L. Fuchs, Wyckoff, NJ (US); Craig Ochikubo, Venice, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,983

(22) Filed: Jun. 2, 2014

(65) Prior Publication Data

US 2014/0341201 A1 Nov. 20, 2014

Related U.S. Application Data

(63) Continuation of application No. 12/484,867, filed on Jun. 15, 2009, now Pat. No. 8,743,848.

(60) Provisional application No. 61/181,067, filed on May 26, 2009.

(51) Int. Cl.
*H04W 4/02* (2009.01)
*H04W 4/00* (2009.01)
*H04L 29/08* (2006.01)
*H04W 8/26* (2009.01)
*H04W 88/06* (2009.01)
*H04W 84/12* (2009.01)

(52) U.S. Cl.
CPC ............... *H04W 4/023* (2013.01); *H04L 67/18* (2013.01); *H04W 4/001* (2013.01); *H04W 4/02* (2013.01); *H04W 8/26* (2013.01); *H04W 84/12* (2013.01); *H04W 88/06* (2013.01)

(58) Field of Classification Search
CPC ....... H04W 4/023; H04W 4/001; H04W 4/02; H04W 84/12; H04W 88/06; H04W 8/26; H04L 67/18
USPC .......................................... 370/338, 311, 401
See application file for complete search history.

(56) References Cited

U.S. PATENT DOCUMENTS 7,584,233 B2 * 9/2009 Koob et al. .................. 708/211
7,856,234 B2 * 12/2010 Alizadeh-Shabdiz et al. .......................... 455/456.1

(Continued)

*Primary Examiner* — Mohammad Anwar
(74) *Attorney, Agent, or Firm* — Garlick & Markison; Shayne X. Short

(57) ABSTRACT

Hybrid location determination for wireless communication device. Various services that may be used by a wireless communication device within a particular location may be referred to as location based services (LBS). As such, means by which the location of a wireless communication device that may use such available services, within such a locale, is made by using more than one type of location determination approach. For example, a wireless communication device includes communication capability (e.g., RX and TX) in accordance with a first communication protocol (e.g., Bluetooth) and also includes a communication capability (e.g., RX only) in accordance with a second communication protocol (e.g., WiFi/WLAN (Wireless Local Area Network)). The RX capability is operative to assist in location determination for the wireless communication device based on knowledge of at least one wireless communication device that communicates with the wireless communication device.

20 Claims, 13 Drawing Sheets

(56) References Cited

U.S. PATENT DOCUMENTS

| | | | |
|---|---|---|---|
| 8,743,848 B2* | 6/2014 | Ibrahim et al. | 370/338 |
| 8,891,497 B1* | 11/2014 | Vleugels | 370/338 |
| 2009/0168800 A1* | 7/2009 | Leinonen et al. | 370/464 |
| 2010/0091732 A1* | 4/2010 | Roeder et al. | 370/331 |
| 2010/0299517 A1* | 11/2010 | Jukic | H04L 63/0823 713/150 |

* cited by examiner

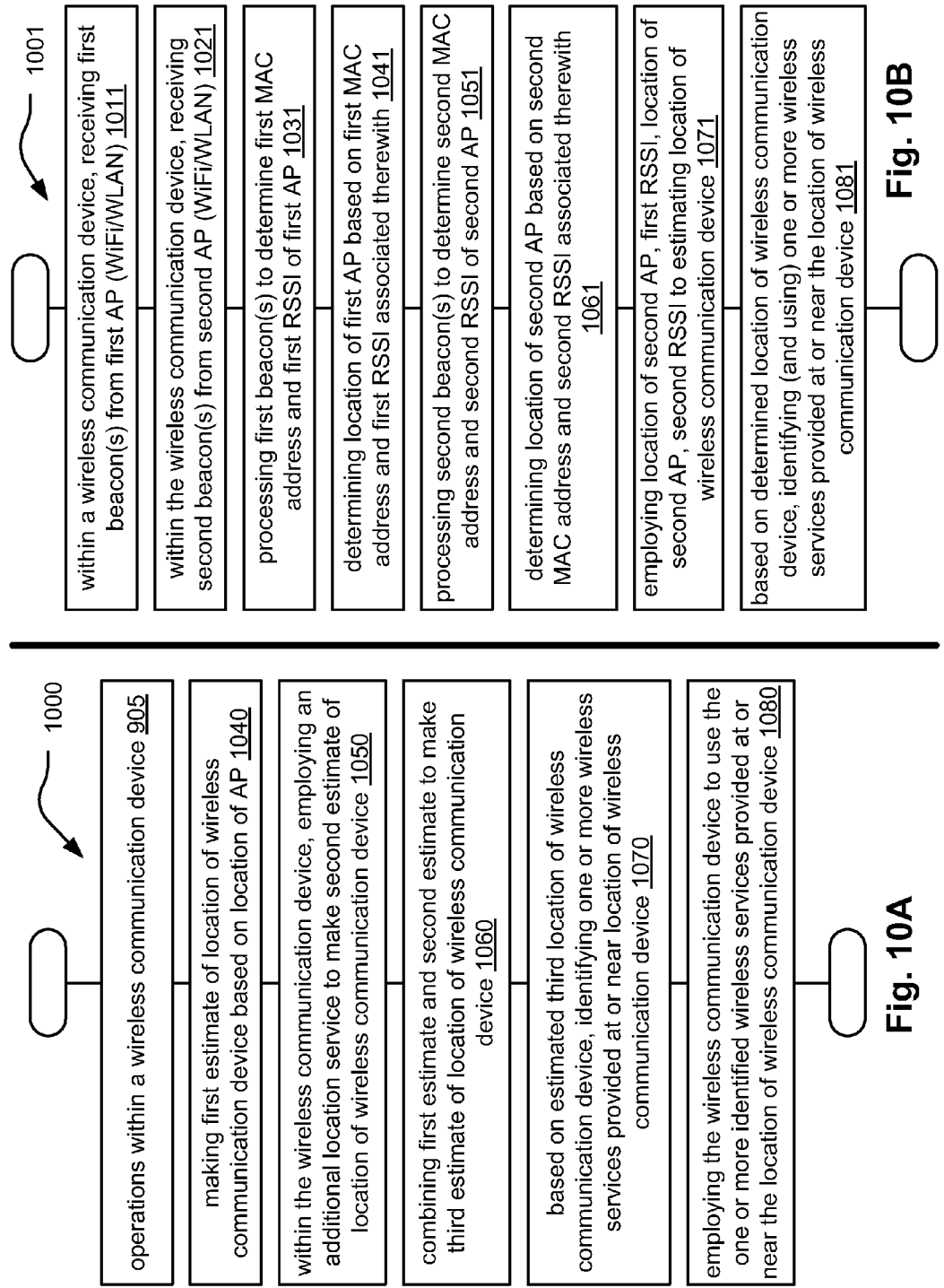

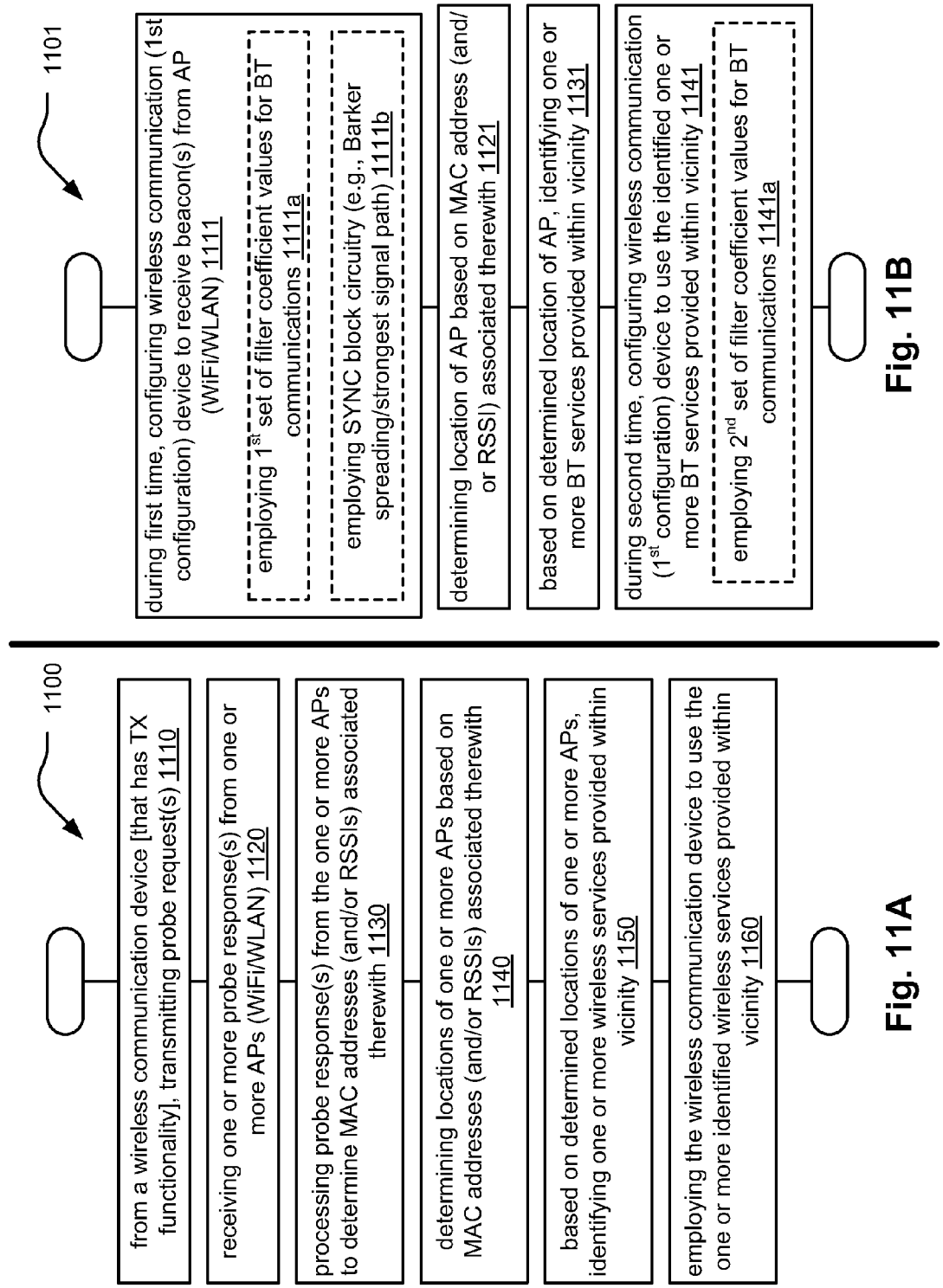

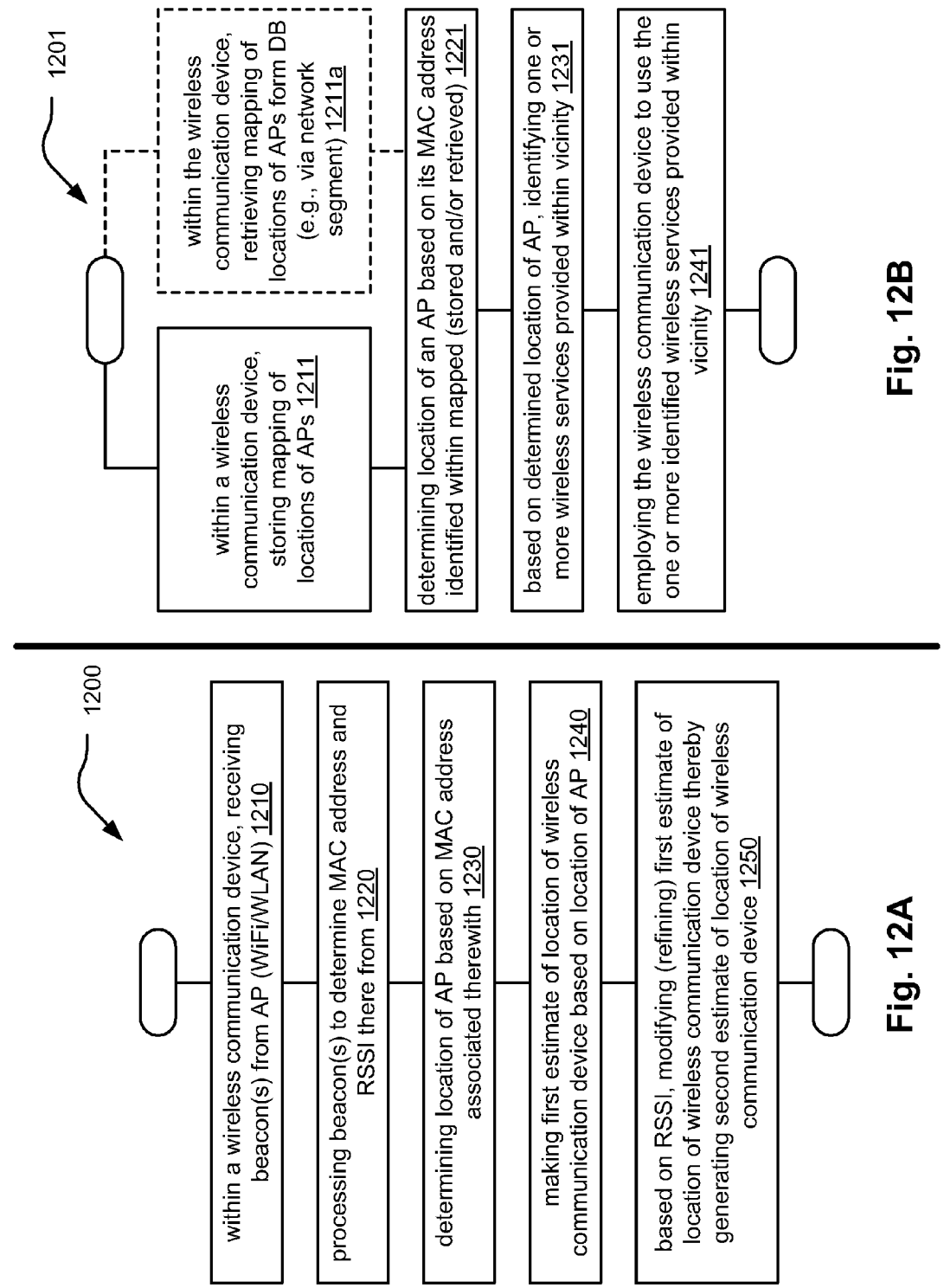

HYBRID LOCATION DETERMINATION FOR WIRELESS COMMUNICATION DEVICE

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120 as a continuation of U.S. Utility application Ser. No. 12/484,867, entitled "Hybrid location determination for wireless communication device," filed Jun. 15, 2009, and scheduled subsequently to be issued as U.S. Pat. No. 8,743,848 on Jun. 3, 2014 (as indicated in an ISSUE NOTIFICATION mailed on May 14, 2014), which claims priority pursuant to 35 U.S.C. §119(e) to U.S. Provisional Application No. 61/181,067, entitled "Hybrid location determination for wireless communication device", filed May 26, 2009, both of which are hereby incorporated herein by reference in their entirety and made part of the present U.S. Utility Patent Application for all purposes.

INCORPORATION BY REFERENCE

The following U.S. Utility Patent Applications/U.S. Patents are hereby incorporated herein by reference in their entirety and made part of the present U.S. Utility Patent Application for all purposes:

1. U.S. Utility patent application Ser. No. 10/243,857, entitled "Channel estimation in a spread spectrum receiver," filed Sep. 13, 2002, now U.S. Pat. No. 7,301,993 B, issued on Nov. 27, 2007.

2. U.S. Utility patent application Ser. No. 11/387,340, entitled "Method and system for antenna and radio front-end topologies for a system-on-a-chip (SOC) device that combines bluetooth and IEEE 802.11b/g WLAN technologies," filed Mar. 23, 2006, pending, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/686,482, entitled "Method and system for antenna and radio front-end topologies for a system-on-a-chip (SOC) device that combines bluetooth and IEEE 802.11a/b/g WLAN technologies," filed Jun. 1, 2005.

3. U.S. Utility patent application Ser. No. 11/751,848, entitled "Shared LNA and PA gain control in a wireless device," filed May 22, 2007, now U.S. Pat. No. 8,112,053 B2, issued on Feb. 7, 2012.

BACKGROUND OF THE INVENTION

1. Technical Field of the Invention

The invention relates generally to wireless communication devices; and, more particularly, it relates to determining location of such wireless communication devices for use, at least in part, to determining which location based services (LBSs) are available for use by such wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. However, such desires have gone unrealized when it comes to implementing baseband and RF on the same chip for multiple wireless communication standards. In addition, many components and/or modules within the components employed within such communication devices and wireless communication devices include many off-chip elements.

BRIEF DESCRIPTION OF THE SEVERAL VIEWS OF THE DRAWINGS

FIG. 9A, FIG. 9B, FIG. 10A, FIG. 10B, FIG. 11A, FIG. 11B, FIG. 12A, and FIG. 12B, illustrates various embodiments of methods that may be performed within a wireless communication device to process received communications.

DETAILED DESCRIPTION OF THE INVENTION

Figure 1:
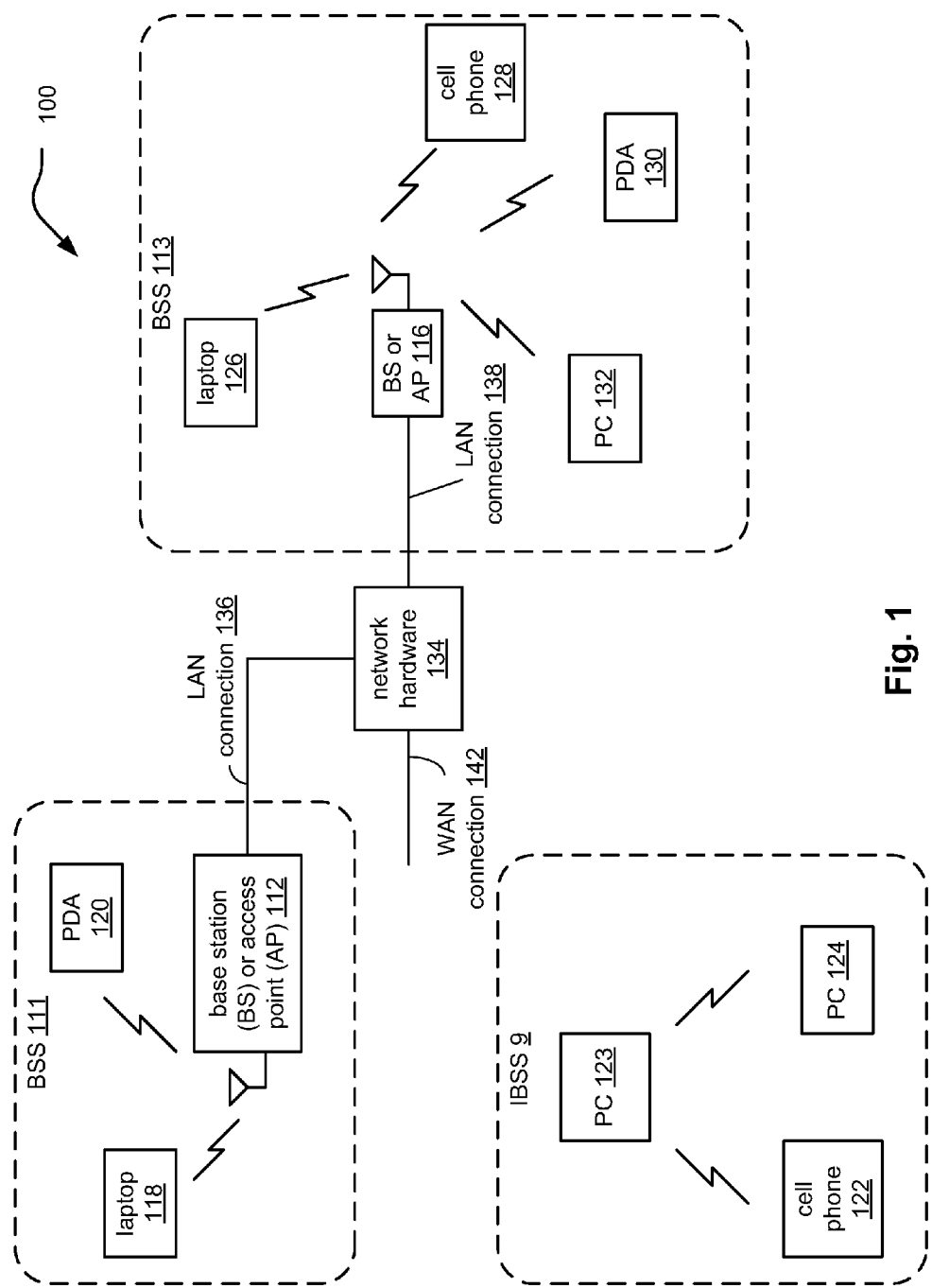
FIG. 1 is a diagram illustrating an embodiment of a wireless communication system.

Location based services (LBSs) continue to grow in availability. Such LBSs may be viewed as those particular communication services provided within a particular location. Determining the location of such a communication device is employed in accordance with the process of determining which services are then available to that communication device.

The use of LBSs continues to become ever-increasing in view of the integration of multiple wireless technologies onto various wireless communication devices (e.g., mobile platforms, portable wireless communication devices, etc.). As such, an improved means for performing location determination (using hybrid location techniques) is presented herein. Such a hybrid approach is inherently improved when compared to relying on a single technology, such as global positioning system (GPS) alone to determine the location of such a wireless communication device.

This determined location information is used to offer location based services (LBS). One example of such a hybrid technique as described herein is based on knowledge of proximate wireless local area network (WLAN/WiFi) (or alternatively referred to only as WLAN) access point (AP) as determined based on an associated IEEE 802.11 MAC address provided to a WiFi-enabled wireless communication device (e.g., smartphone) for use in determining the location of such a wireless communication device.

The market penetration of Bluetooth into various wireless communication devices (e.g., mobile phone devices) is extremely high versus the penetration of WiFi, which is still a fairly nascent market for a variety of reasons (e.g., there are limited use cases involving the use of WiFi in mobile devices to justify the significant additional die area and power consumption penalties associated with adding full WiFi capabilities to the mobile device).

Therefore, for the large market of Bluetooth-enabled devices that do not have embedded WiFi capability, only a reduced functionality/minimum subset of WLAN/WiFi functionality is implemented or embedded in a Bluetooth capable communication device in order to obtain the required MAC addresses from a WLAN AP (e.g., an IEEE 802.11 2.4 GHz WiFi Access Point, or one operating in accordance with a different version of the IEEE 802.11 standards and using a different frequency).

Generally speaking, no WLAN/WiFi transmitter capability is required at all within the communication device, and of all the modulation types and rates supported by the evolving IEEE 802.11 standard, the only WLAN/WiFi receiver capability receive implemented is for the Barker-spread 1 Mbps rate, differential binary phase shift keying (DBPSK) modulation that is required to obtain the information relevant to location (i.e. media access control (MAC) address and/or signal strength indication (RSSI) associated with communications from such a WLAN AP).

Only a very slight modification (which translates into only a very modest increase in die area) of an existing Bluetooth radio receiver's design is made to also support processing of WLAN/WiFi beacons from a WLAN AP and from which the relevant location-related information can be extracted.

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, etc., provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access point 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
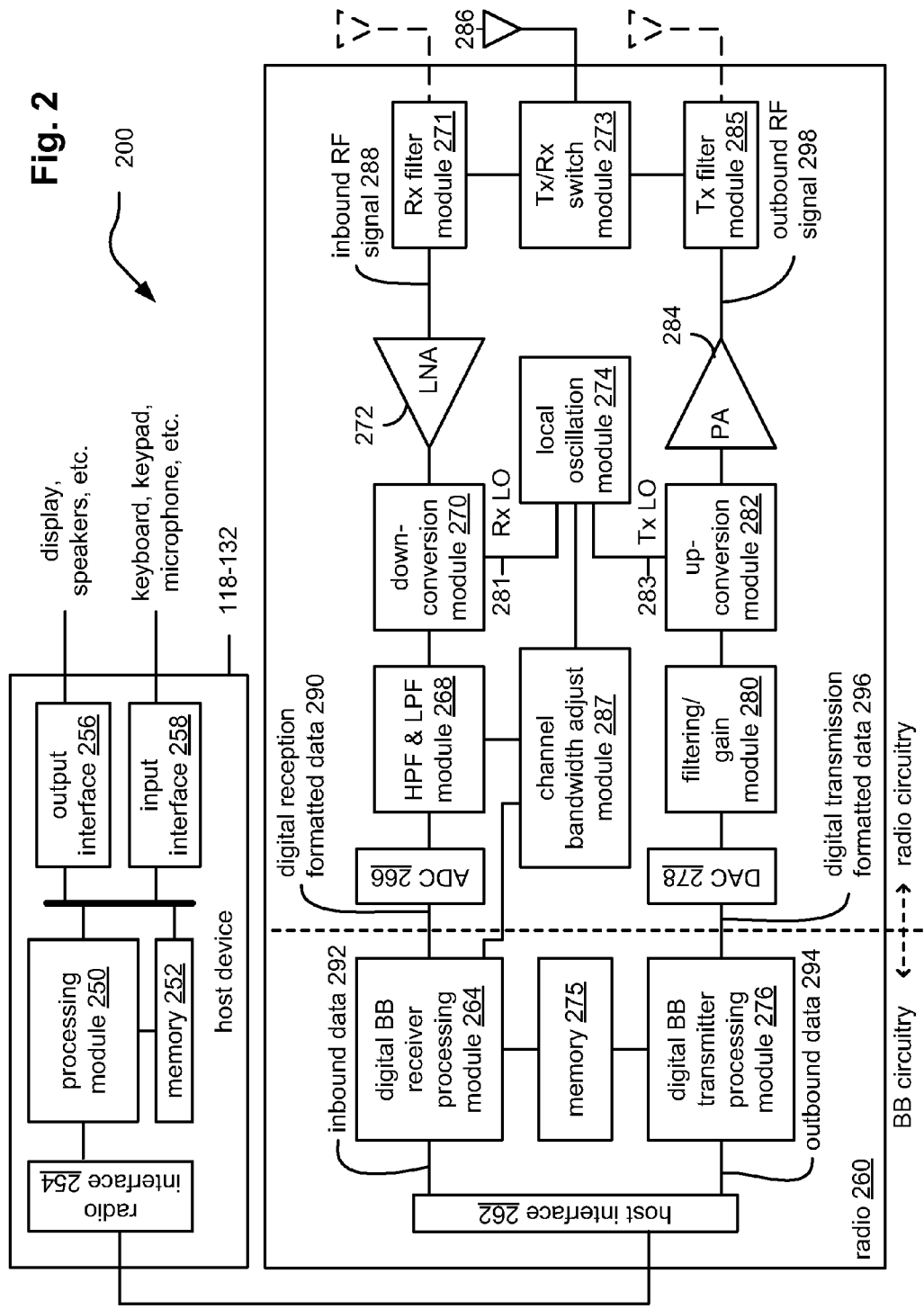
FIG. 2 is a diagram illustrating an embodiment of a wireless communication device.

FIG. 2 is a diagram illustrating an embodiment 100 of a wireless communication device that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, etc., such that the received data may be displayed. The radio interface 254 also provides data from the processing module 250 to the radio 260. The processing module 250 may receive the outbound data from an input device such as a keyboard, keypad, microphone, etc., via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274, memory 275, a digital transmitter processing module 276, a digital-to-analog converter 278, a filtering/gain module 280, an IF mixing up conversion stage 282, a power amplifier 284, a transmitter filter module 285, a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device is compliant.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, ZigBee, WiMAX (Worldwide Interoperability for Microwave Access), any other type of radio frequency based network protocol and/or variations thereof etc.) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As one of average skill in the art will appreciate, the wireless communication device of the embodiment 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a wireless local area network (WLAN/WiFi) (e.g., one of the IEEE (Institute of Electrical and Electronics Engineer) 802.11 protocols such as 802.11a, 802.11b, and/or 802.11g), a Bluetooth protocol, or any other predetermined means by which wireless communication may be effectuated.

Figure 3:
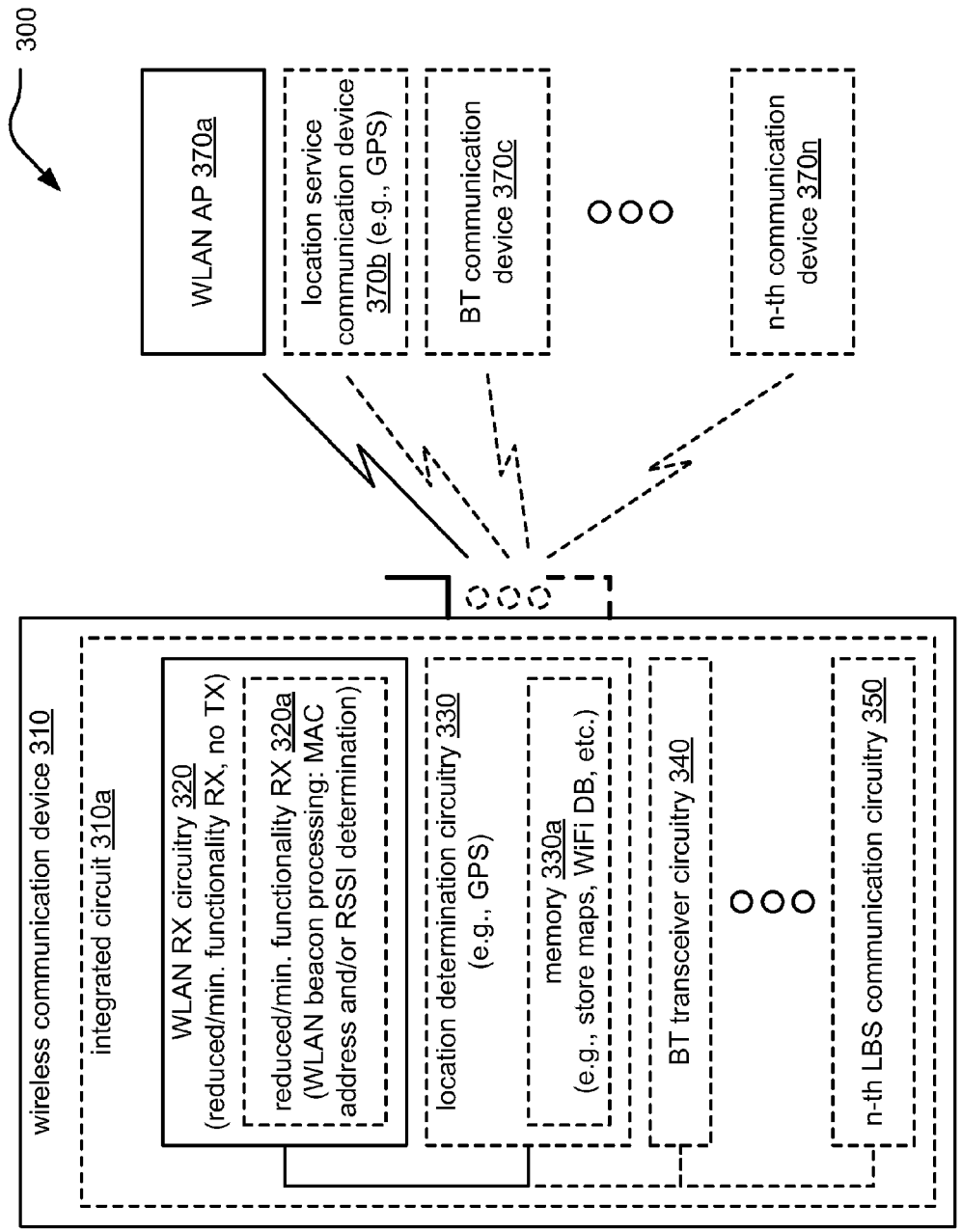
FIG. 3 is a diagram illustrating an alternative embodiment of a wireless communication device.

FIG. 3 is a diagram illustrating an alternative embodiment 300 of a wireless communication device 310. The wireless communication device 310 includes a wireless local area network (WLAN/WiFi) receiver (RX) circuitry 320. In some embodiments, the wireless communication device 310 includes a location determination circuitry 330 (which may include a memory module 330a that is operative to store one or more maps, database components, etc.), a Bluetooth (BT) transceiver circuitry 340, and up to an n-th location based service (LBS) communication circuitries 350 (i.e., one or both of RX circuitry and/or transmitter (TX) circuitry). Each of these radio circuitries is coupled to a baseband circuitry that is operative to perform various digital signal processing functions as well.

One or more of the components within the wireless communication device 310 may be implemented within a single integrated circuit 310a, or they may alternatively be implemented in two or more integrated circuits, and/or one or more printed circuit boards. The wireless communication device 310 is operative to communicate with a WLAN access point (AP) 370a. Depending on which components are particularly implemented within the wireless communication device 310 (i.e., by including a location determination circuitry 330), the wireless communication device 310 may also be operative to communicate with a location service communication device 370b (e.g., a global positioning system (GPS) satellite type location based servicing communication device). Also, in embodiments where the wireless communication device 310 includes a BT transceiver 340, the wireless communication device 310 may also be operative to communicate with another BT communication device 370c. Clearly, in embodiments where the wireless communication device 310 includes an n-th LBS communication circuitry 350, the wireless communication device 310 may also be operative to communicate with an n-th communication device 370n (e.g., that operates in accordance with an n-th communication protocol).

The WLAN RX circuitry 320 is a reduced or minimum functionality receiver circuitry that need not include any transmitter (TX) capability at all. This reduced/minimum functionality RX is operative to perform WLAN beacon processing, as shown in a block 320a. This minimal amount of processing of only a portion of the communications provided from the WLAN AP 370a includes extracting the media access control (MAC) address and/or the received signal strength indication (RSSI) measures associated with such communications.

In many or most situations, the location of an AP is known. Such information is communicated with and may be extracted from the MAC address associated with a communication from such an AP. In terms of determining location of the wireless communication device 310, the determined location of the WLAN AP 370a may be used to make an estimate of the location of the wireless communication device 310. For example, if the wireless communication device 310 is operative to communicate with the WLAN AP 370a, then it is certainly located within a sufficient proximity of the WLAN AP 370a (whose location is known). As such, a preliminary estimate of the location of the wireless communication device 310 may be made.

Once the location of the WLAN AP 370a or the wireless communication device 310 is known, then that known location may be used to determine the various communication services that may be available in that locale for use by the wireless communication device 310. The wireless communication device 310 may then use one or more of such LBSs.

Figure 4:
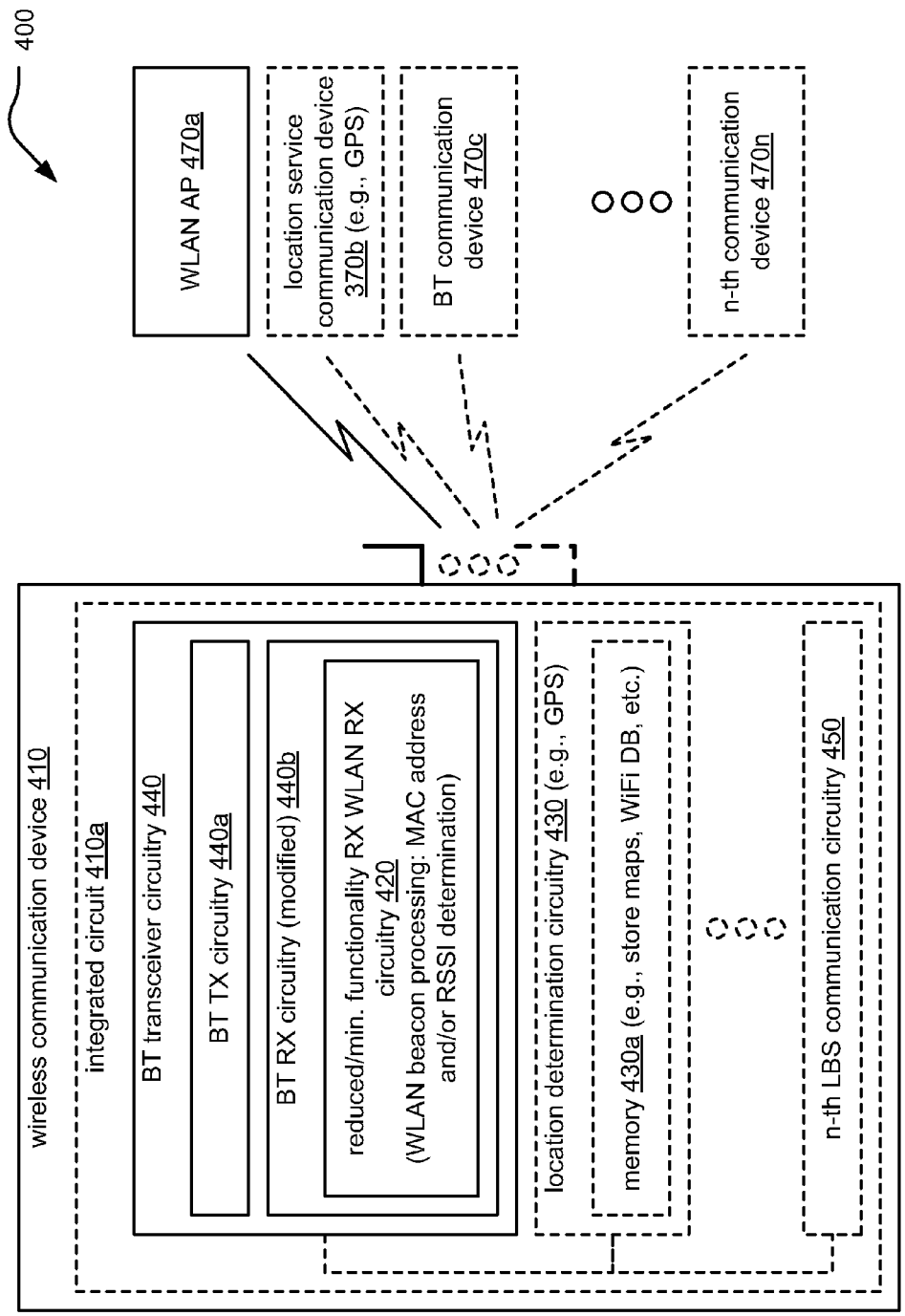
FIG. 4 is a diagram illustrating an alternative embodiment of a wireless communication device.

FIG. 4 is a diagram illustrating an alternative embodiment 400 of a wireless communication device 410. This embodiment 400 has some similarities to the previous embodiment 300. For example, wireless communication device 410 may be implemented using a single integrated circuit 410a, one or more integrated circuits, printed circuit boards, etc. Also, depending on which components are particularly implemented within the wireless communication device 410 (i.e., by including a location determination circuitry 430), the wireless communication device 410 may also be operative to communicate with a location service communication device 470b (e.g., a GPS satellite type location based servicing communication device). In embodiments where the wireless communication device 410 includes an n-th LBS communication circuitry 450, the wireless communication device 410 may also be operative to communicate with an n-th communication device 470n (e.g., that operates in accordance with an n-th communication protocol). Each of these radio circuitries is coupled to a baseband circuitry that is operative to perform various digital signal processing functions as well.

However, at least one difference being that the wireless communication device 410 is that a BT transceiver circuitry 440 includes a BT TX circuitry 440a and a BT RX circuitry 440b (that is modified with respect to a conventional or typical BT RX circuitry to allow processing of beacons provided by WLAN AP 470a).

There is significant re-use or sharing of processing resources, circuitry, etc. within the BT RX circuitry 440b to perform also the processing of beacons provided by the WLAN AP 470a to process only a portion of the communications provided from the WLAN AP 470a includes extracting the MAC address and/or the RSSI measures associated with such communications. In other words, there is very little modification of the BT RX circuitry 440b to enable the ability to perform processing of communications provided from the WLAN AP 470a. For example, the one or more antennae of the wireless communication device 410, the low noise amplifier (LNA) stages and automatic gain control (AGC) stages, one or more mixers, etc. of the BT RX circuitry 440b are employed commonly for processing both BT communications as well as for WLAN communications. Even the filter structure within the BT RX circuitry 440b is same for both BT communications as well as for WLAN communications (with only difference being the values of the coefficients used for each). One additional functional block or circuitry employed to process the beacons provided in accordance with WLAN communications is a SYNC functional block or circuitry, which operates to remove Barker spreading and to identify the strongest signal path, based on which frame timing is determined.

Generally speaking, by using knowledge of a proximate WLAN AP (e.g., as determined by the IEEE 802.11 MAC address associated therewith), then determination of which LBSs that may be available within the locale of the WLAN AP or the wireless communication device (whose location may be estimated by its proximity to the known location of a WLAN AP with which the wireless communication device may communicate [i.e., receive beacons from]). RSSI information may also be measured, for applications where this additional piece of information is useful (e.g., in accordance with triangulation using communications received from two or more WLAN APs.

In accordance with performing hybrid position determination, an A-GPS may achieve a faster time to fix first (TTFF) on a Bluetooth and GPC (BT+GPC) processing core combination.

Referring to the memory 330a or 430a of the previous embodiments, a wireless communication device (or user operating such wireless communication device) may download (e.g., via a wireless network connection, a cable connection, BT connection, or other communication connection) a WLAN AP database for a particular geographic region in which the wireless communication device or user is located (e.g., resides, in which the user is traveling, etc.).

Alternatively, if the size of a much larger database (e.g., nationwide database) is not too large, the wireless communication device could be pre-loaded with such a larger database (e.g., of a portion or all of a nation, of a portion of a continent [such as Western Europe], etc.). In order to improve TTFF, the device would then be able to map the AP's MAC address to its corresponding GPS co-ordinates of the AP (e.g., as confirmed with respect to the database). This would operate to give the co-located GPS operative device a good head-start towards initial acquisition in terms of location determination thereby.

In accordance with performing location determination for a communication device that is only BT capable when no collocated GPS is available, those LBSs that are nearby may also be identified. For example, this mode of operation gives the device some initial clue about its location/whereabouts (e.g., consider Apple's iPod Touch). Therein, the iPhone and iTouch use software from Skyhook Wireless for this purpose. As mentioned above, RSSI information may be used to further refine the accuracy of the wireless communication device's location estimate (e.g., with respect to triangulation).

WLAN APs, operating in accordance with IEEE 802.11, typically operate at a particular frequency (e.g., 2.4 GHz for IEEE 802.11b, 5 GHz for IEEE 802.11a, etc.) and transmit beacons at the 1 Mbps rate, using DBPSK modulation with direct-sequence spread spectrum (DSSS) spreading at approximately 1 beacon every 100 ms. The MAC address can be obtained from the MAC header as well as the service set identifier (SSID) information, which is embedded in the frame body field of the IEEE 802.11 management frame, if SSID is useful. In general, all demodulated WLAN bits from the beacon could simply be dumped to memory, in order for Firmware to post-process this information in order to obtain the MAC address and other relevant information. RSSI may also be measured on the beacons frames; for array antenna based platforms, the measurement accuracy would be improved even in disperse channels. In accordance with certain WLAN/WiFi service providers, some of them maintain databases of WiFi APs along with their location coordinates, that will be associated with the MAC addresses extracted from communications from such WLAN APs.

As referred to above, only a reduced or minimum amount of IEEE 802.11 receiver functionality is employed or needed to accommodate the processing of beacons provided from such a WLAN AP.

With respect to the radio circuitry within such a wireless communication device, the radio receiver path need only be modified in a very minor way to accommodate the 20 MHz wide WLAN signal bandwidth, which is currently narrower to remove ambient country identifier (ACI) and blockers for Bluetooth. The first AADF stages of the radio receiver path have wider than 20 MHz bandwidths and the DS oversampling is high enough to obtain adequate dynamic range.

With respect to the baseband processing circuitry within such a wireless communication device, the automatic gain control (AGC) circuitry, the IEEE 802.11 frame detection, 11 MHz (single-sided bandwidth) channel select filtering, initial time and frequency correction, followed by channel estimation and demodulation of bits is the normal sequence of flow for some IEEE 802.11b receivers.

To simplify the baseband processing, there is no need to include any RAKE matched filtering. From the output of the Barker Matched Filter (BMF) based SYNC block, the strongest path may simply be chosen (i.e., instead of doing any combining processing therein). For more disperse channels, the signal to noise ratio (SNR) penalty will increase by taking this short-cut, but in typical cases there may be a minor loss of performance (e.g., 2 to 3 dB in some embodiments). This minor performance loss may be compensated by the fact that in order to minimize the hidden-node problem, AP's (usually connected to wall-power outlets providing 120 V AC at approximately 60 Hz) transmit at higher (and at fixed) transmit levels, than wireless stations (STAs).

Thus, a simplified baseband hardware module or circuitry of such a wireless communication device may simply comprise of a BMF (simple, 22-tap FIR filter running at 22 MHz). Also, the SYNC block simply picks the strongest path component. Early-late time tracking is performed on samples out of the BMF. Bluetooth's Early-Late hardware can be reused for time tracking purposes. Basically, the BMF gives synchronization to within 1 chip and then time tracking is done to reduce the synchronization error further. Carrier frequency offset (CFO), due to differences in the transmitter and receiver local oscillators (Los), results in a constant phase error at the output of the demodulator and can also be removed by reusing BT circuitry. Also, the start of frame delimiter (SFD) is also used from the frame sync.

A BT demodulator may be modified (with only a slight modification required) to perform DBPSK demodulation of the beacons provided by a WLAN AP. The IEEE 802.11 receive digital processing is based on operation of I/Q samples at 22 Ms/s, so a sample rate conversion to 22 Ms/s would need to be performed. The rate adaptor hardware in the current BT design is able to provide this.

Also, the very same configurable channel select filter as used in current BT design may be employed for processing the beacons provided by the WLAN AP. However it is noted that this will need to be clocked at a higher frequency to accommodate the 20 MHz signal.

As can be seen, the vast majority of components within the BT receiver may be also used to perform the processing of received beacons from the WLAN AP. The BT receiver architecture lends itself well to a significant level of sharing for use in BT communications. For example, sharing for the processing of both BT and WLAN communications may be made with respect to the one or more antennae, LNA stages and the AGC logic, mixer(s), etc. and even filter structures can remain the same (with the only changes being to the filter coefficient values), in order to support either the narrow band Bluetooth signals or wide band WLAN signals. The main digital block needed is the SYNC block to remove the Barker spreading and identify the strongest signal path, based on which frame timing is determined.

Also, it is noted that there may be only a need to store demodulated bits from the beacons themselves (e.g., and no need to store any other bits/communications from a WLAN AP or STA transmissions). Therefore, hardware-assist may also be provided to ascertain that the frame is in fact a beacon, before dumping such bits to memory. IEEE 802.11 frames consist of a MAC header, followed by a variable length frame body and then a 32-bit cyclic redundancy check (CRC). Beacons can be identified by the all 1s destination MAC address, which is used for broadcast. If the MAC address indicates a beacon, then the remainder of the frame should continue being demodulated. Alternatively, if the MAC address does not indicate a beacon, then the remainder of the frame could be dumped/discarded.

The hardware-assist is employed to extract the frame duration information from the MAC header, in order to know how long to continue the demodulation processing. However, the CRC checking (FCS) can be performed in firmware, if desired in some embodiments.

Moreover, there is no need to support carrier sense multiple access/collision avoidance (CSMA/CA) protocol, since such wireless communication device operates as a passive, listen-only sniffer that does not ever transmit.

Figure 5:
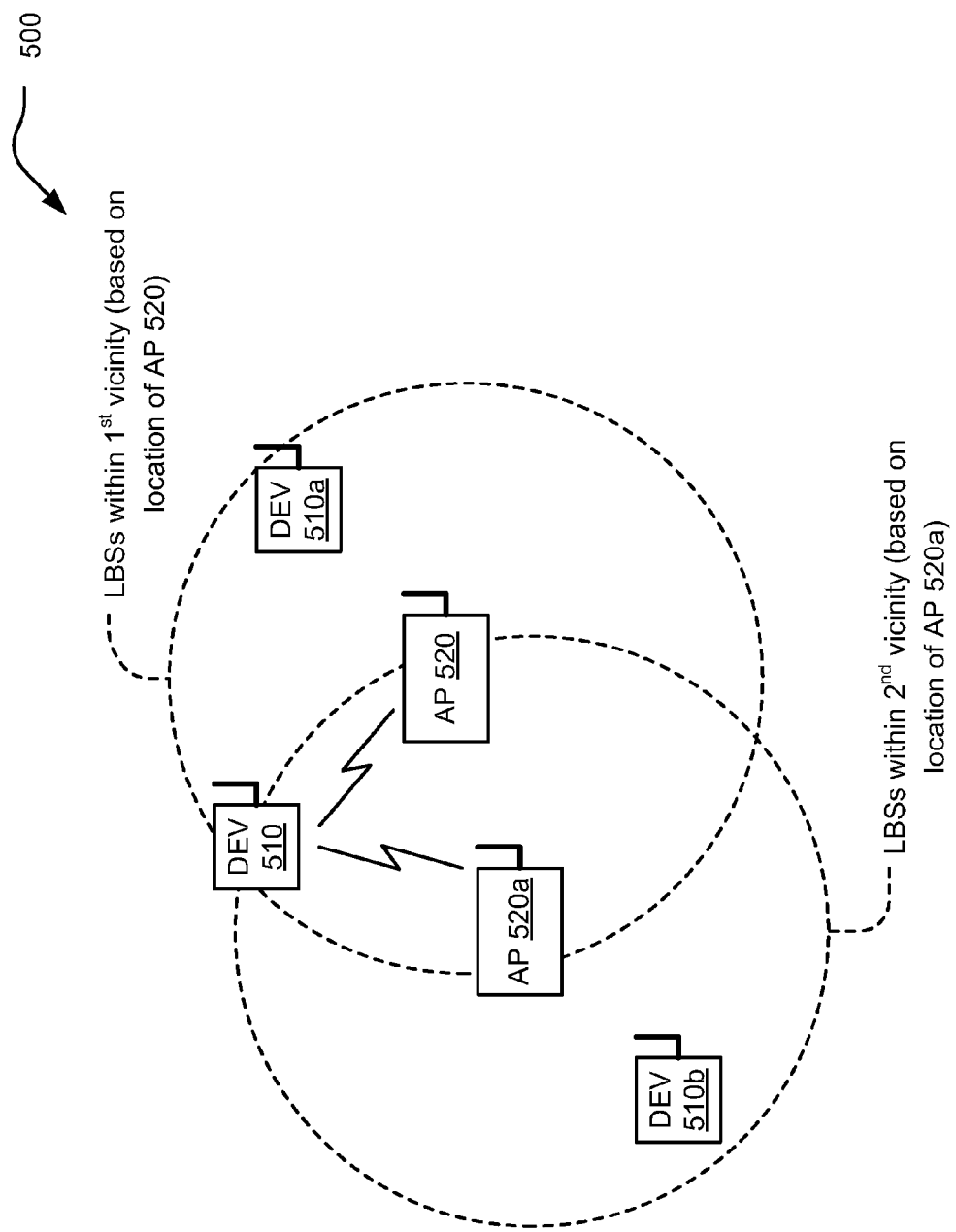
FIG. 5 is a diagram illustrating an embodiment of regions in which various location based services (LBSs) are provided with respect to locations of access points (APs), respectively.

FIG. 5 is a diagram illustrating an embodiment 500 of regions in which various location based services (LBSs) are provided with respect to locations of access points (APs), respectively. When a wireless communication device is operative to communicate with (at least receive beacons from) an AP, then an estimate of the location of the wireless communication device may be made based on its proximity to the AP. With such knowledge of a location of a wireless communication device or an AP with which the wireless communication device communicates, the location based services (LBSs) provided within the vicinity or near the location of the wireless communication device or the AP.

For example, each of the wireless communication devices 510, 510a, and 510b are located within proximity to be able to communicate with (at least receive beacons from) each of the AP 520 and the AP 520a. As such, the determined locations of the APs 520 and 520a (e.g., based on the MAC addresses of the beacons provided there from), LBSs provided within such vicinities may be presented for availability and use by the wireless communication devices 510, 510a, and 510b.

Figure 6:
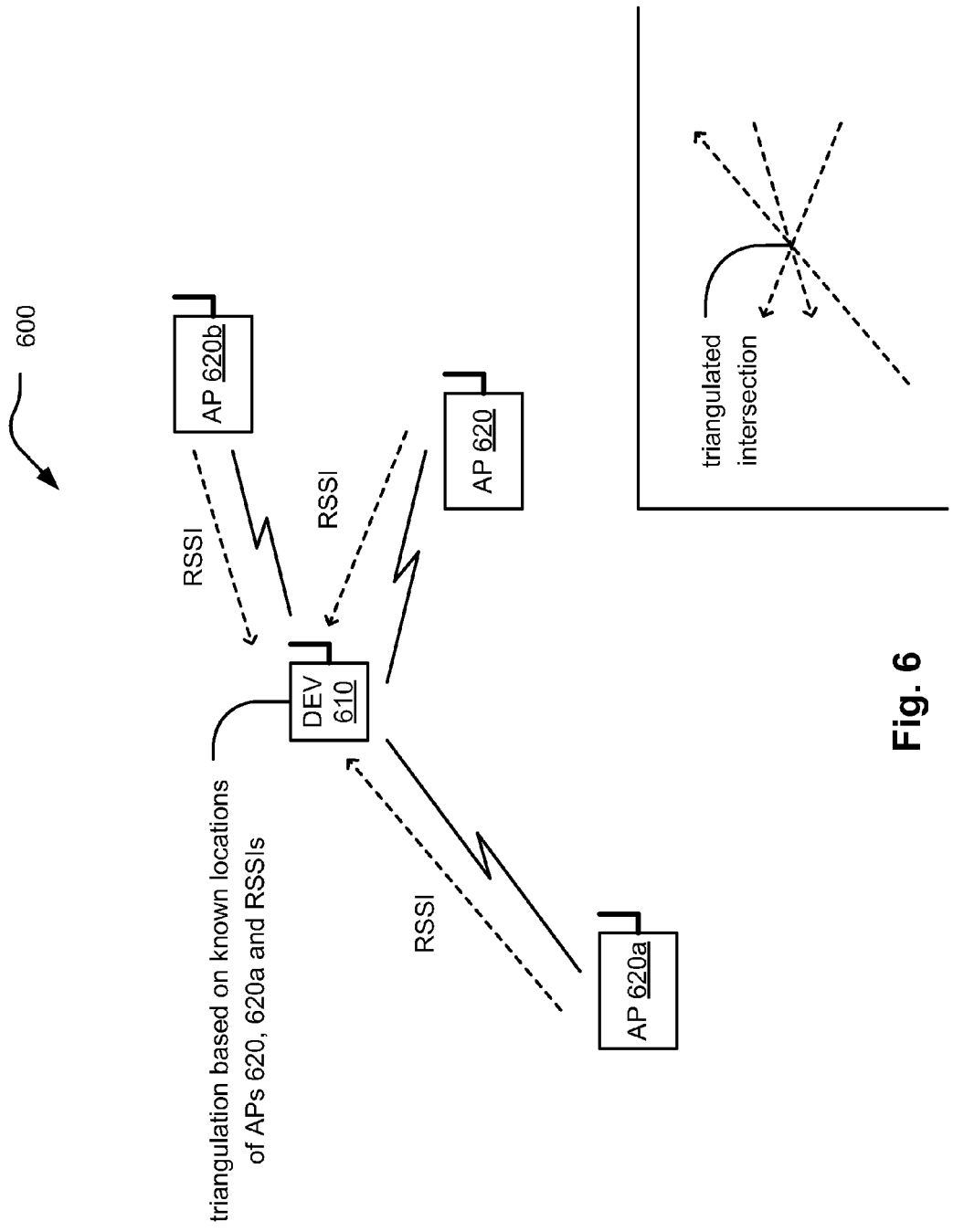
FIG. 6 is a diagram illustrating an embodiment of triangulation as may be performed within a wireless communication device based on communications received from three or more APs and the associated received signal strength indication (RSSI) measures associated therewith.

FIG. 6 is a diagram illustrating an embodiment 600 of triangulation as may be performed within a wireless communication device based on communications received from three or more APs 620, 620a, 620b and the associated received signal strength indication (RSSI) measures associated therewith.

Information associated with communications provided from three or more APs 620, 620a, 620b (or even more APs not specifically shown in the diagram) may be employed to determine the location of a wireless communication device receiving such communications. Based on the attenuation of signals as they propagate from a first wireless communication device to a second wireless communication device, the RSSI measures associated with such signals may be used to determine how far away a particular WLAN AP is. For example, when the original signal strength is known (e.g., when transmitted from the AP), and then when the received signal strength is determined (e.g., RSSI measure when received at the wireless communication device), then the difference in power or energy (e.g., based on the attenuation during propagation) of those two signals may be correlated to the distance between the wireless communication device and the AP.

When RSSI measures associated with communications from three or more APs are employed, then triangulation of the two or more signals may be made to estimate more precisely the location of the wireless communication device. For examples, based on the intersections of the vectors associated with the communications from three or more communication devices, a triangulated intersection may be estimated thereby estimating the location of the communication device 610.

Figure 7:
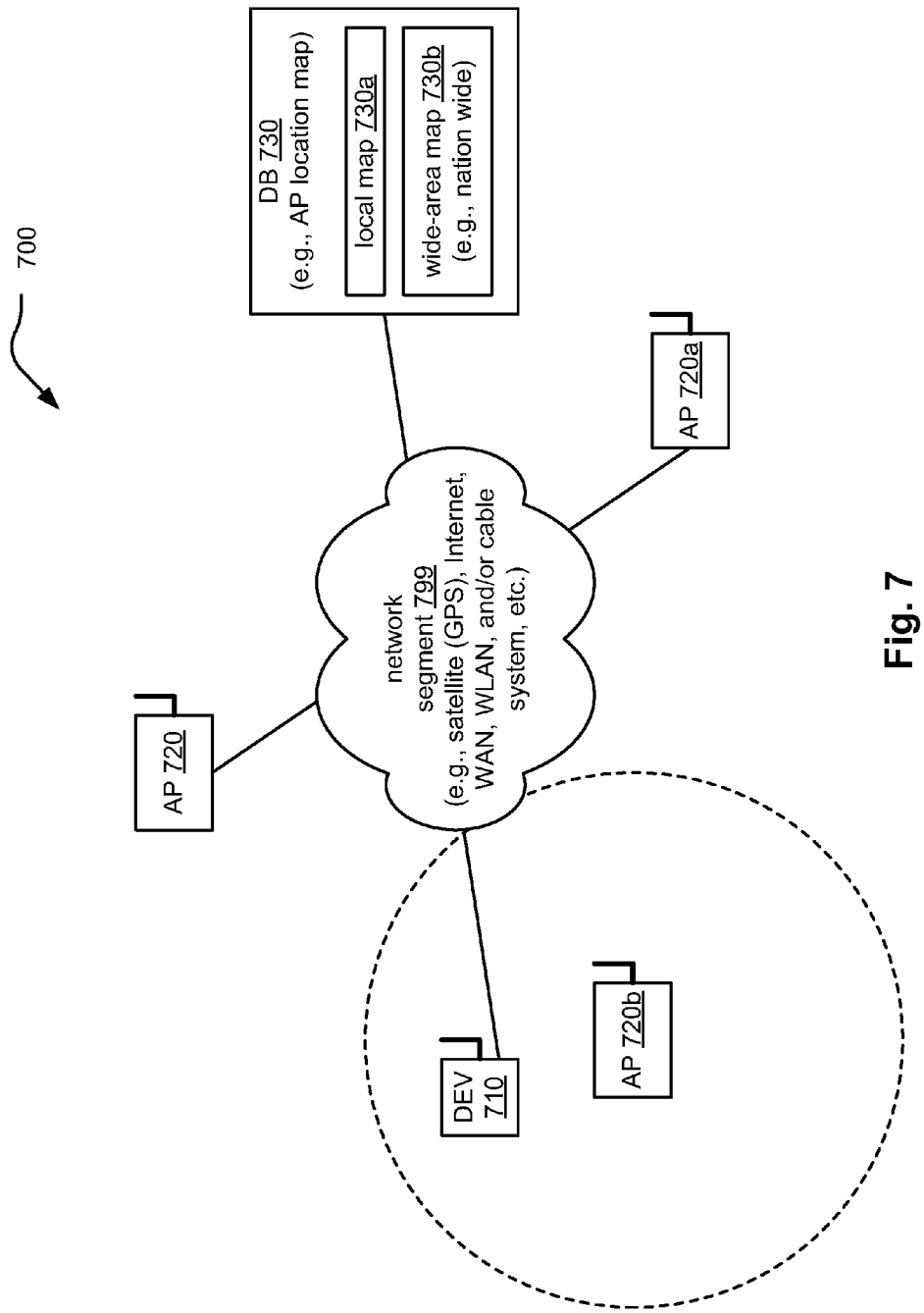
FIG. 7 is a diagram illustrating an embodiment of connectivity between a wireless communication device and various other communication devices via a network segment and/or other communication paths.

FIG. 7 is a diagram illustrating an embodiment 700 of connectivity between a wireless communication device and various other communication devices via a network segment and/or other communication paths.

A wireless communication device 710 may be located within a region or vicinity serviced by an AP 720b. Via the AP 720b or via another communication link (e.g., network segment 799, which may be a satellite/global positioning system (GPS) communication link, an Internet wide area network (WAN), WLAN, and/or cable system), the wireless communication device 710 may also communicate with other APs 720 and 720b, and the wireless communication device 710 may also access a remote database (D) 730, which may include a local map 730a or a wide-area map 730b (e.g., such as a nationwide map) corresponding to particular locations of APs. For example, when the wireless communication device receives a communication from the AP a720b (e.g., a beacon and then extracts the MAC address there from), the wireless communication device 710 may then access the DB 730 to retrieve the location associated with the AP 720b (e.g., by comparing the extracted MAC address to one of the maps within the DB 730). Alternatively, the wireless communication device 710 may retrieve and download such lists of AP locations from the DB 730 before extracting a MAC address from a communication received from the AP 720b.

The firmware of such a wireless communication device may be implemented to schedule when to look for such WLAN AP/IEEE 802.11 beacons. The format of a management frame (of which, the beacon is one type) is illustrated below). Approximately 1 beacon is transmitted per 100 ms (typical), but the beacon can be delayed by a few milliseconds if the AP is completing a transaction with another wireless communication device/wireless station (STA). To perform effective receipt and processing of beacons provided by a WLAN AP, there is only a need to receive 1 beacon (i.e., the very first one), so there is not necessarily any benefit to recording the embedded timestamp information and beacon interval info to help with BT coexistence (e.g., to narrow the search window for future beacon transmissions from the same WLAN AP).

Figure 8:
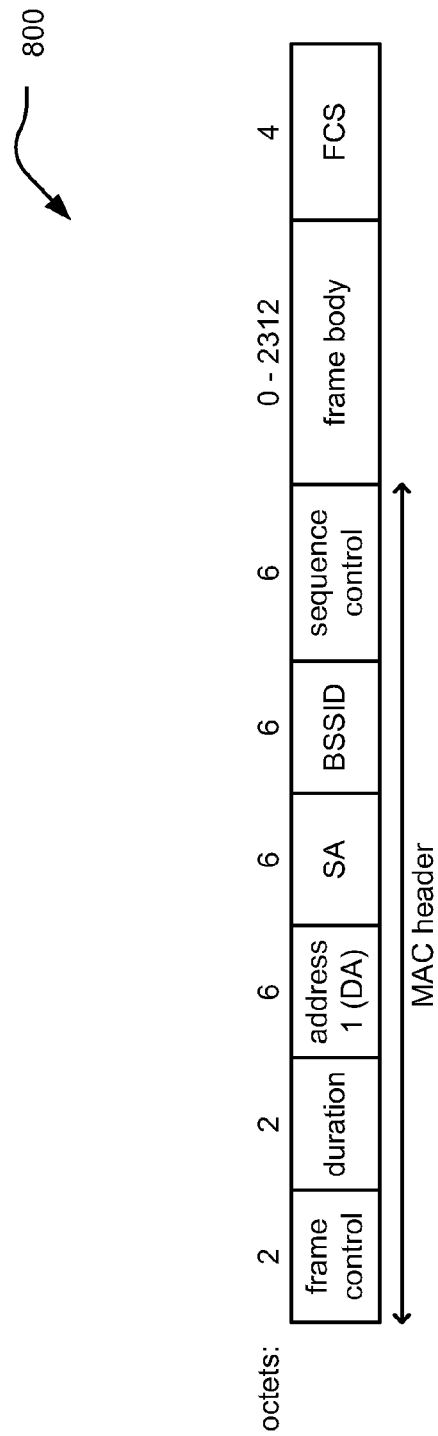
FIG. 8 is a diagram illustrating an embodiment of format of a management frame.

FIG. 8 is a diagram illustrating an embodiment 800 of format of a management frame. For LBS service identification, the only information needed from the beacon frame is the WLAN AP's MAC address. This MAC address is the 'fingerprint' of the AP and is all that is really needed for LBS database (at least those based on or with respect to the location of the WLAN AP), i.e. the database associates the GPS coordinates of the AP with its MAC address.

Moreover, RSSI information may also be useful, for example, if there are multiple APs being used for triangulation, etc. such as depicted herein with respect to FIG. 6.

After the hardware has indicated that it has detected a beacon, and the hardware then dumps all the bits (e.g., as few as approximately 400 bits or as long as approximately 2000 bits) to memory, the firmware can take over and do the CRC check and then extract the MAC address information there from. It is noted tote that the beacon frame body length is variable because as the IEEE 802.11 specification has evolved to higher rates and a richer feature set, more information elements have been added to the frame body, for the newer STAs to exploit the added capabilities.

FIG. 9A, FIG. 9B, FIG. 10A, FIG. 10B, FIG. 11A, FIG. 11B, FIG. 12A, and FIG. 12B, illustrates various embodiments of methods that may be performed within a wireless communication device to process received communications.

Figures 9A, 9B:
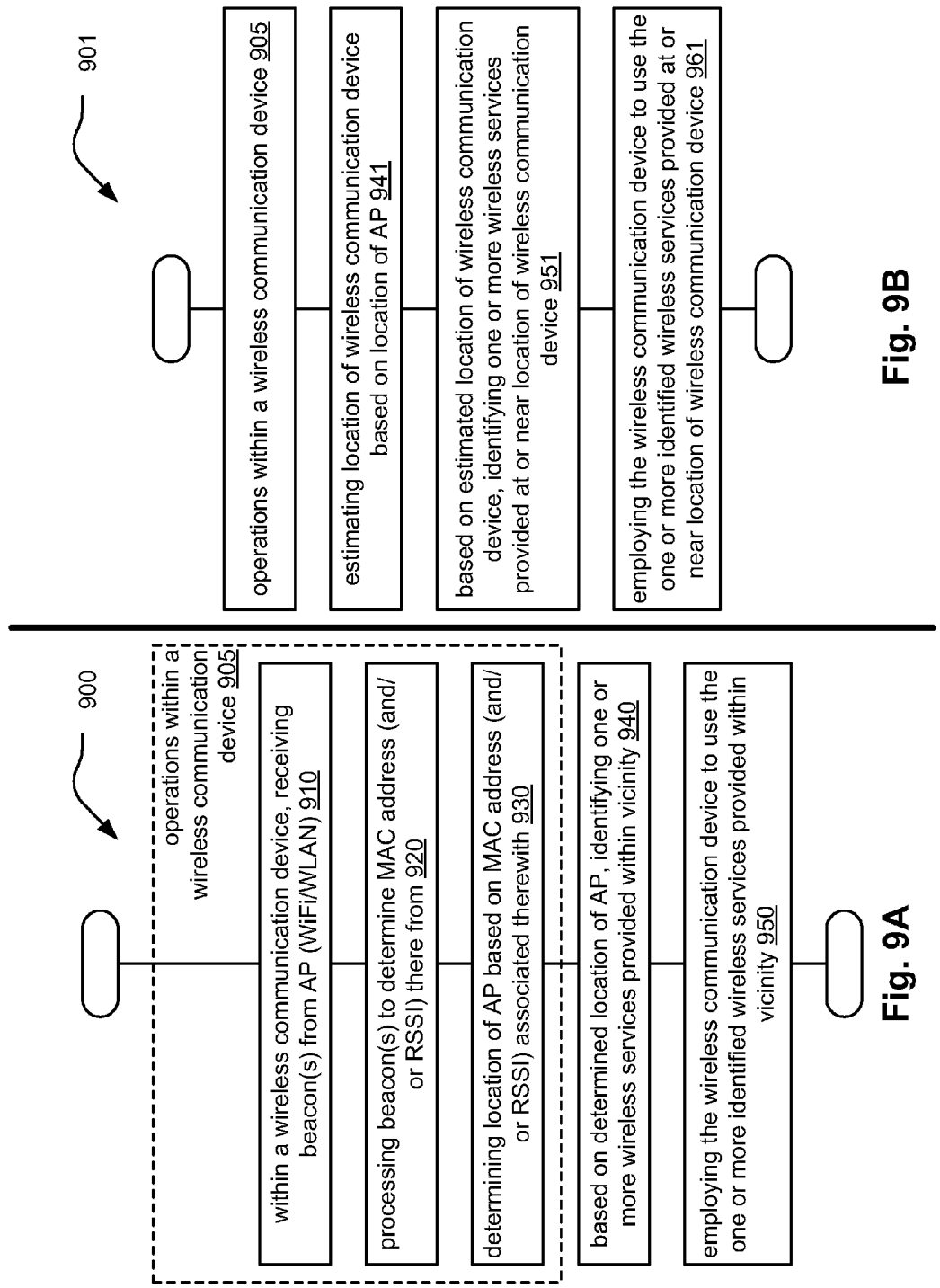

Referring to method 900 of FIG. 9A, the method 900 operates within a wireless communication device and begins by receiving beacon(s) from AP (WiFi/WLAN), as shown in a block 910. The method 900 continues by processing beacon(s) to determine MAC address (and/or RSSI) there from, as shown in a block 920.

The method 900 then operates by determining location of AP based on MAC address (and/or RSSI) associated therewith, as shown in a block 930. These operations as depicted in blocks 910, 920, and 930 may generally be referred to as operations within a wireless communication device, as shown in a block 905 (see FIG. 9).

The method 900 continues by based on determined location of AP, identifying one or more wireless services provided within vicinity, as shown in a block 940. The method 900 continues by employing the wireless communication device to use the one or more identified wireless services provided within vicinity, as shown in a block 950.

Referring to method 901 of FIG. 9B, the method 901 begins by performing the operations within a wireless communication device, as shown in a block 905 (see FIG. 9).

The method 901 then operates by estimating location of wireless communication device based on location of AP, as shown in a block 941. Based on estimated location of wireless communication device, the method 901 then operates by identifying one or more wireless services provided at or near location of wireless communication device, as shown in a block 951. The method 901 continues by employing the wireless communication device to use the one or more identified wireless services provided at or near location of wireless communication device, as shown in a block 961.

Referring to method 1000 of FIG. 10A, the method 1000 begins by performing the operations within a wireless communication device, as shown in a block 905 (see FIG. 9).

The method 901 then operates by making first estimate of location of wireless communication device based on location of AP, as shown in a block 1040. Within the wireless communication device, the method 1000 continues by, employing an additional location service to make second estimate of location of wireless communication device, as shown in a block 1050. The method 1000 then operates by combining first estimate and second estimate to make third estimate of location of wireless communication device, as shown in a block 1060.

Based on estimated third location of wireless communication device, the method 1000 continues by identifying one or more wireless services provided at or near location of wireless communication device, as shown in a block 1070. The method 1000 continues by employing the wireless communication device to use the one or more identified wireless services provided at or near the location of wireless communication device, as shown in a block 1080.

Referring to method 1001 of FIG. 10B, within a wireless communication device, the method 1001 begins by receiving first beacon(s) from first AP (WiFi/WLAN), as shown in a block 1011. The method 1001 then operates by within the wireless communication device, receiving second beacon(s) from second AP (WiFi/WLAN), as shown in a block 1021.

The method 1001 continues by processing first beacon(s) to determine first MAC address and first RSSI of first AP, as shown in a block 1031. The method 1001 then operates by determining location of first AP based on first MAC address and first RSSI associated therewith, as shown in a block 1041.

The method 1001 then continues by processing second beacon(s) to determine second MAC address and second RSSI of second AP, as shown in a block 1051. The method 1001 then operates by determining location of second AP based on second MAC address and second RSSI associated therewith, as shown in a block 1061.

The method 1001 then continues by employing location of second AP, first RSSI, location of second AP, second RSSI to estimating location of wireless communication device, as shown in a block 1071. Based on determined location of wireless communication device, the method 1001 then operates by identifying (and using) one or more wireless services provided at or near the location of wireless communication device, as shown in a block 1081.

Referring to method 1100 of FIG. 11A, from a wireless communication device [that has TX functionality], the method 1100 begins by transmitting probe request(s), as shown in a block 1110. The method 1100 continues by receiving one or more probe response(s) from one or more APs (WiFi/WLAN), as shown in a block 1120.

The method 1100 then operates by processing probe response(s) from the one or more APs to determine MAC addresses (and/or RSSIs) associated therewith, as shown in a block 1130.

The method 1100 continues by determining locations of one or more APs based on MAC addresses (and/or RSSIs) associated therewith, as shown in a block 1140. Based on determined locations of one or more APs, the method 1100 then operates by identifying one or more wireless services provided within vicinity, as shown in a block 1150. The method 1100 continues by employing the wireless communication device to use the one or more identified wireless services provided within vicinity, as shown in a block 1160.

Referring to method 1101 of FIG. 11B, the method 1101 provides a means by which speeding up the acquisition of the SSID information may be made via probe requests. For example, if a user has just powered up a wireless communication device (e.g., a phone), and the user wants to quickly to find out which APs are present in the vicinity, the wireless communication device could send probe requests on the WLAN center frequencies and receive probe responses from the nearby APs (the probe response format is almost identical to that of a beacon).

With this variation of a wireless communication device in providing probe requests (i.e., having TX capability), however, it is noted that such a wireless communication device is no longer a passive, IEEE 802.11 sniffer type of device (i.e., that includes no TX capability). In such an embodiment, there may be a need to implement a CSMA/CA protocol (i.e., to decode the NAVs to figure out when a probe request may be transmitted).

Also, there may be some WiFi Alliance certification issues encountered if a subset of the IEEE 802.11 specification is implemented and communication are attempted in accordance with standard WLAN APs. It is noted that the passive WLAN scans on all 11 (or 13) WLAN center frequencies are typically very slow. In contrast, the co-located GPS may synchronize faster than the WiFi-based coarse positioning. Practically speaking, in some applications, it may not be worth the cost to add active scanning and 1 Mbps WiFi transmit capability within such a wireless communication device (e.g., the protocol capability as well as TX path modifications to allow the transmitting of probe requests).

Referring to method 1101 of FIG. 11B, the method 1101 begins, during a first time, by configuring wireless communication (1st configuration) device to receive beacon(s) from AP (WiFi/WLAN), as shown in a block 1111. This may involve employing $1^{st}$ set of filter coefficient values for BT communications, as shown in a block 1111a. This may also involve performing employing SYNC block circuitry (e.g., Barker spreading/strongest signal path), as shown in a block 1111b.

The method 1101 then operates by determining location of AP based on MAC address (and/or RSSI) associated therewith, as shown in a block 1121.

Based on determined location of the AP, the method 1101 continues by identifying one or more BT services provided within vicinity, as shown in a block 1131.

During a second time, the method 1101 then operates by, configuring wireless communication (1st configuration) device to use the identified one or more BT services provided within vicinity, as shown in a block 1141. In some embodiments, this may involve employing $2^{nd}$ set of filter coefficient values for BT communications, as shown in a block 1141a (compare to operations of block 1111a).

Referring to method 1200 of FIG. 12A, within a wireless communication device, the method 1200 begins by receiving beacon(s) from AP (WiFi/WLAN), as shown in a block 1210.

The method 1200 continues by processing beacon(s) to determine MAC address and RSSI there from, as shown in a block 1220. The method 1200 then operates by determining location of AP based on MAC address associated therewith, as shown in a block 1230.

The method 1200 continues by making first estimate of location of wireless communication device based on location of AP, as shown in a block 1240. Based on the RSSI, the method 1200 then operates by modifying (refining) first estimate of location of wireless communication device thereby generating second estimate of location of wireless communication device, as shown in a block 1250.

Referring to method 1201 of FIG. 12B, within a wireless communication device, the method 1201 begins by storing mapping of locations of APs, as shown in a block 1211. In an alternative embodiment, within the wireless communication device, the method 1210 operates by retrieving mapping of locations of APs form DB (e.g., via network segment), as shown in a block 1211a.

The method 1201 then operates by determining location of an AP based on its MAC address identified within mapped (stored and/or retrieved), as shown in a block 1221. Based on determined location of AP, the method 1201 continues by identifying one or more wireless services provided within vicinity, as shown in a block 1231. The method 1201 then operates by employing the wireless communication device to use the one or more identified wireless services provided within vicinity, as shown in a block 1241.

Figure 13:
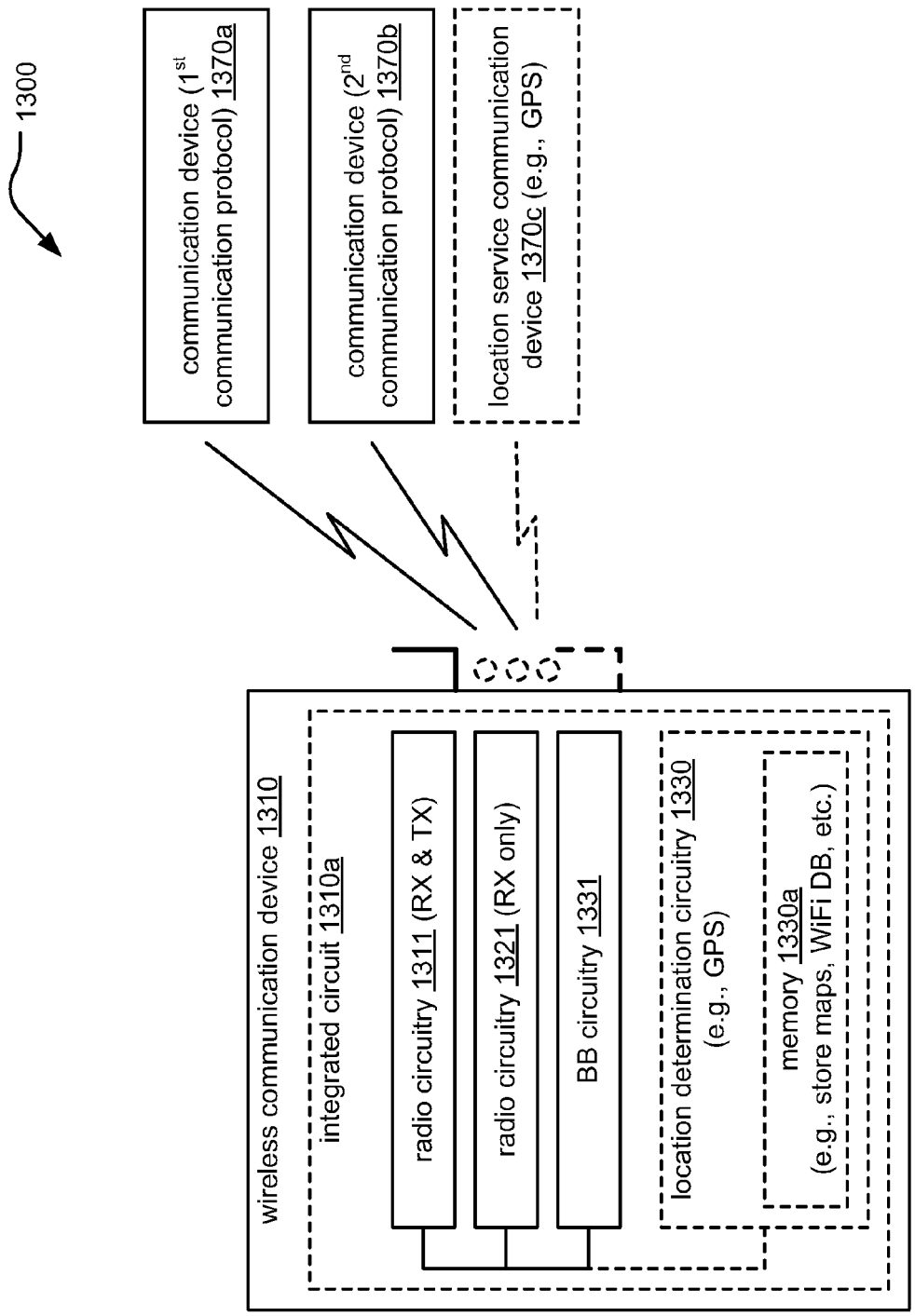
FIG. 13 is a diagram illustrating an alternative embodiment of a wireless communication device.

FIG. 13 is a diagram illustrating an alternative embodiment 1300 of a wireless communication device. The wireless communication device 1310 includes a first radio circuitry 1311 (having TX and RX capability) and a second radio circuitry 1321 (having only RX capability). The first radio circuitry 1311 is operative to communicate with a communication device 1370a, and the first radio circuitry 1321 is operative to receive communications from communication device 1370b.

In some embodiments, the wireless communication device 1310 includes a location determination circuitry 1330 (which may include a memory module 1330a that is operative to store one or more maps, database components, etc.). The location determination circuitry 1330 may communicate with a location service communication device 1370c.

Each of these radio circuitries is coupled to a baseband (BB) processing circuitry 1331 that is operative to perform various digital signal processing functions as well.

One or more of the components within the wireless communication device 1310 may be implemented within a single integrated circuit 1310a, or they may alternatively be implemented in two or more integrated circuits, and/or one or more printed circuit boards. The wireless communication device 1310 is operative to support bi-directional communications comporting with a first communication protocol using the first radio circuitry 1311. The wireless communication device 1310 is operative to support uni-directional communications comporting with a second communication protocol using the second radio circuitry 1321.

The baseband processing circuitry 1331, coupled to the first radio circuitry 1311 and the second radio circuitry 1321, that is operative to process the uni-directional communications comporting with the second communication protocol thereby extracting a media access control (MAC) address there from. This MAC address may correspond to at least one additional communication device that transmits the uni-directional communications to the wireless communication device 1310. In some embodiments, these uni-directional communications may be beacons transmitted from a WLAN AP.

This MAC address associated with at least one additional transmitting wireless communication device is used to make an estimate of a location of the wireless communication device 1310 and/or the at least one additional transmitting wireless communication device.

Based on the estimate of the location of the wireless communication device 1310 and/or the at least one additional transmitting wireless communication device, the baseband processing circuitry 1331 identifies at least one location based service available for use by the first radio circuitry 1311 of the wireless communication device 1310.

In some embodiments, the baseband processing circuitry 1331 is operative to process the uni-directional communications comporting with the second communication protocol thereby calculating a received signal strength indication (RSSI) measure associated therewith. The estimate of the location of the wireless communication device 1310 and/or the estimate of the location of the at least one additional transmitting wireless communication device is derived from both the MAC address and the RSSI measure (i.e., not the MAC address alone, but using both the MAC address and the RSSI measure [which may be employed in accordance with ranging operations]).

When multiple communications are received from multiple additional wireless communication devices, and multiple respective RSSI measures are calculated, triangulation processing may be employed when three or more communications are received to identify a triangulated intersection that is corresponds to an estimate of the location of the wireless communication device 1310.

In some embodiments, the first radio circuitry 1311 is a Bluetooth transceiver circuitry, and the second radio circuitry 1321 is a wireless local area network (WLAN) receiver circuitry. The uni-directional communications comporting with the second communication protocol may include a WLAN beacon transmitted from a WLAN access point (AP).

When implemented within a particular embodiment, the location determination circuitry 1330 is operative to compare the MAC address to a number of MAC addresses (e.g., such as retrieved from a remote database, stored within the memory 1330a, from a combination thereof, etc.). Based upon a favorable comparison of the MAC address with one of the MAC addresses (e.g., matching up with one another), the location determination circuitry 1330 is operative to estimate a location of the wireless communication device 1310 and/or a location of the communication device 1370b. An estimate of the location of the communication device 1370b (that is firstly calculated) may be employed to make an estimate of the location of the wireless communication device 1310.

It is noted that the various modules and/or circuitries (e.g., encoding modules, decoding modules, receiver circuitries, transmitter circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A wireless communication device comprising:
    a communication interface that supports transmitter operations based only on a first communication protocol and that supports receiver operations based on both the first communication protocol and a second communication protocol; and
    processor, at least one of the processor or the communication interface configured to:
        support bi-directional communications with a first other wireless communication device via the communication interface based on the first communication protocol by performing both the transmitter operations and the receiver operations based on the first communication protocol;
        support uni-directional communications with a second other wireless communication device via the communication interface based on the second communication protocol by performing the receiver operations based only on the second communication protocol, wherein the uni-directional communications include receiving the uni-directional communications from the second other wireless communication device;
        process a first portion of a frame of the uni-directional communications to determine whether the frame is a predetermined type;
        process a second portion of the frame when the frame is determined to be the predetermined type; and
        discard the frame when the frame is determined to be different than the predetermined type.

2. The wireless communication device of claim 1, wherein the at least one of the processor or the communication interface is further configured to:
    identify at least one location based service (LBS) for use by the wireless communication device based on the uni-directional communications received from the second other wireless communication device.

3. The wireless communication device of claim 1, wherein the at least one of the processor or the communication interface is further configured to:
    process the uni-directional communications to extract a media access control (MAC) address;
    estimate location of the wireless communication device based on a favorable comparison of the MAC address with a plurality of MAC addresses of a plurality of known wireless communication devices having known locations; and
    identify at least one location based service (LBS) for use by the wireless communication device based on the estimate of the location of the wireless communication device.

4. The wireless communication device of claim 1, wherein the at least one of the processor or the communication interface is further configured to:
    support other uni-directional communications with third other wireless communication device via the communication interface based on the second communication protocol, wherein the other uni-directional communications include receiving the other uni-directional communications from the third other wireless communication device;
    process the uni-directional communications to extract first media access control (MAC) address;
    process the other uni-directional communications to extract second MAC address;
    estimate location of the wireless communication device based on a favorable comparison of the first and second MAC addresses with a plurality of MAC addresses of a plurality of known wireless communication devices having known locations;
    process first received signal strength indicator (RSSI) of the uni-directional communications and second RSSI the other uni-directional communications based on triangulation to refine the estimate of the location of the wireless communication device to generate a refined estimate of the location of the wireless communication device; and
    identify at least one location based service (LBS) for use by the wireless communication device based on the refined estimate of the location of the wireless communication device.

5. The wireless communication device of claim 1, wherein the at least one of the processor or the communication interface is further configured to: process the first portion of the frame of the uni-directional communications to determine whether the frame is a predetermined type, wherein the first portion of the frame is a media access control (MAC) address and the predetermined type is a beacon type;
    process the second portion of the frame when the frame is determined to be the beacon type, wherein the second portion of the frame includes a remainder of the frame following the MAC address; and
    discard the frame when the frame is determined to be different than the beacon type.

6. The wireless communication device of claim 1 further comprising:
    transmitter circuitry and receiver circuitry, wherein the transmitter circuitry is configured to operate only based on the first communication protocol, and wherein the receiver circuitry is configured to operate based on both the first communication protocol and the second communication protocol.

7. The wireless communication device of claim 1, wherein the first communication protocol is a Bluetooth communication protocol, and the second communication protocol is a wireless local area network (WLAN) communication protocol.

8. The wireless communication device of claim 1 further comprising:
    a wireless station (STA), wherein the first other wireless communication device is another STA, and the second other wireless communication device is an access point (AP).

9. A wireless communication device comprising:
    a communication interface that supports transmitter operations based only on a Bluetooth communication protocol and that supports receiver operations based on both the Bluetooth communication protocol and a wireless local area network (WLAN) communication protocol; and
    a processor, at least one of the processor or the communication interface configured to:

support bi-directional communications with a first other wireless communication device via the communication interface by performing both the transmitter operations and the receiver operations based on the Bluetooth communication protocol;

support uni-directional communications with a second other wireless communication device via the communication interface based on the WLAN communication protocol by performing the receiver operations based only on the WLAN communication protocol, wherein the uni-directional communications include receiving the uni-directional communications from the second other wireless communication device;

process a first portion of a frame of the uni-directional communications to determine whether the frame is a predetermined type;

process a second portion of the frame when the frame is determined to be the predetermined type; and discard the frame when the frame is determined to be different than the predetermined type.

10. The wireless communication device of claim 9, wherein the processor is further configured to:

process the uni-directional communications interface based on the WLAN communication protocol to extract a media access control (MAC) address;

estimate location of the wireless communication device based on a favorable comparison of the MAC address with a plurality of MAC addresses of a plurality of known wireless communication devices having known locations; and identify at least one location based service (LBS) for use by the wireless communication device based on the estimate of the location of the wireless communication device.

11. The wireless communication device of claim 9, wherein the processor is further configured to:

support other uni-directional communications with third other wireless communication device via the communication interface based on the WLAN communication protocol, wherein the other uni-directional communications include receiving the other uni-directional communications from the third other wireless communication device;

process the uni-directional communications to extract first media access control (MAC) address;

process the other uni-directional communications to extract second MAC address;

estimate location of the wireless communication device based on a favorable comparison of the first and second MAC addresses with a plurality of MAC addresses of a plurality of known wireless communication devices having known locations;

process first received signal strength indicator (RSSI) of the uni-directional communications and second RSSI the other uni-directional communications based on triangulation to refine the estimate of the location of the wireless communication device to generate a refined estimate of the location of the wireless communication device; and identify at least one location based service (LBS) for use by the wireless communication device based on the refined estimate of the location of the wireless communication device.

12. The wireless communication device of claim 9 further comprising:

transmitter circuitry and receiver circuitry, wherein the transmitter circuitry is configured to operate only based on the Bluetooth communication protocol, wherein the receiver circuitry is configured to operate based on both the Bluetooth communication protocol and the WLAN communication protocol.

13. The wireless communication device of claim 9 further comprising:

a wireless station (STA), wherein the first other wireless communication device is another STA, and the second other wireless communication device is an access point (AP).

14. A method for execution by a wireless communication device, the method comprising:

operating a communication interface of the wireless communication device that supports transmitter operations based only on a first communication protocol and that supports receiver operations based on both the first communication protocol and a second communication protocol;

supporting bi-directional communications with a first other wireless communication device by operating the communication interface to perform both the transmitter operations and the receiver operations based on the first communication protocol;

supporting uni-directional communications with a second other wireless communication device by operating the communication interface to perform the receiver operations based only on the second communication protocol, wherein the uni-directional communications include receiving the uni-directional communications from the second other wireless communication device;

processing a first portion of a frame of the uni-directional communications to determine whether the frame is a predetermined type, wherein the first portion of the frame is a media access control (MAC) address and the predetermined type is a beacon type;

processing a second portion of the frame when the frame is determined to be the beacon type, wherein the second portion of the frame includes a remainder of the frame following the MAC address; and discarding the frame when the frame is determined to be different than the beacon type.

15. The method of claim 14 further comprising:

identifying at least one location based service (LBS) for use by the wireless communication device based on the uni-directional communications received from the second other wireless communication device.

16. The method of claim 14 further comprising:

processing the uni-directional communications to extract a media access control (MAC) address;

estimating location of the wireless communication device based on a favorable comparison of the MAC address with a plurality of MAC addresses of a plurality of known wireless communication devices having known locations; and identifying at least one location based service (LBS) for use by the wireless communication device based on the estimate of the location of the wireless communication device.

17. The method of claim 14 further comprising:

supporting other uni-directional communications with third other wireless communication device via the communication interface based on the second communication protocol, wherein the other uni-directional communications include receiving the other uni-directional communications from the third other wireless communication device;

processing the uni-directional communications to extract first media access control (MAC) address;

processing the other uni-directional communications to extract second MAC address;

estimating location of the wireless communication device based on a favorable comparison of the first and second MAC addresses with a plurality of MAC addresses of a plurality of known wireless communication devices having known locations;

processing first received signal strength indicator (RSSI) of the uni-directional communications and second RSSI the other uni-directional communications based on tri-angulation to refine the estimate of the location of the wireless communication device to generate a refined estimate of the location of the wireless communication device; and identifying at least one location based service (LBS) for use by the wireless communication device based on the refined estimate of the location of the wireless communication device.

18. The method of claim 14, wherein the wireless communication device including transmitter circuitry and receiver circuitry, wherein the transmitter circuitry is configured to operate only based on the first communication protocol, and wherein the receiver circuitry is configured to operate based on both the first communication protocol and the second communication protocol.

19. The method of claim 14, wherein the first communication protocol is a Bluetooth communication protocol, and the second communication protocol is a wireless local area network (WLAN) communication protocol; and further comprising:

processing a first portion of a WLAN frame of the uni-directional communications to determine whether the WLAN frame is a predetermined type, wherein the first portion of the WLAN frame is a media access control (MAC) address and the predetermined type is a WLAN beacon type;

processing a second portion of the WLAN frame when the WLAN frame is determined to be the WLAN beacon type, wherein the second portion of the WLAN frame includes a remainder of the WLAN frame following the MAC address; and discarding the WLAN frame when the WLAN frame is determined to be different than the WLAN beacon type.

20. The method of claim 14, wherein the wireless communication device is a wireless station (STA), the first other wireless communication device is another STA, and the second other wireless communication device is an access point (AP).

* * * * *